US006952991B2

United States Patent
Siegel et al.

(10) Patent No.: US 6,952,991 B2
(45) Date of Patent: Oct. 11, 2005

(54) ROASTING APPARATUS

(75) Inventors: Jeff Siegel, Kings Point, NY (US); Adam Krent, Brooklyn, NY (US); David Linn Burnett, New York, NY (US); William J. Lazaroff, Floral Park, NY (US); Mark P. F. Bechtold, Northport, NY (US)

(73) Assignee: Lifetime Hoan Corporation, Westbury, NY (US)

( * ) Notice: Subject to any disclaimer, the term of this patent is extended or adjusted under 35 U.S.C. 154(b) by 92 days.

(21) Appl. No.: 10/619,201

(22) Filed: Jul. 15, 2003

(65) Prior Publication Data
US 2005/0011371 A1 Jan. 20, 2005

(51) Int. Cl.[7] .............................. A47J 37/04; A47J 43/00
(52) U.S. Cl. .............................. 99/426; 99/444; 99/449; 99/450
(58) Field of Search ........................ 99/426, 444, 449, 99/450, 339, 340, 345, 347; 211/181.1, 175, 49.1, 60.1; 220/912, 573.1; 248/166, 172, 175

(56) References Cited

U.S. PATENT DOCUMENTS

| 5,339,728 A | * | 8/1994 | Marchwiak et al. | .......... 99/426 |
| 5,503,062 A | * | 4/1996 | Buff, IV | ...................... 99/426 |
| 6,668,708 B1 | * | 12/2003 | Swinford et al. | ............. 99/426 |

* cited by examiner

Primary Examiner—Reginald L. Alexander
(74) Attorney, Agent, or Firm—Goodman & Teitelbaum, Esqs.

(57) ABSTRACT

The present invention provides a roasting apparatus that includes a roasting pan that reliably secures an improved roasting rack. The roasting rack is secured in retaining channels on respective handle bosses providing a 4-point support system that resists lateral and transverse shifting during use. A pair of handles extends along a long axis of the roasting rack enabling simple and secure separation of the roasting rack from the roasting pan.

13 Claims, 4 Drawing Sheets

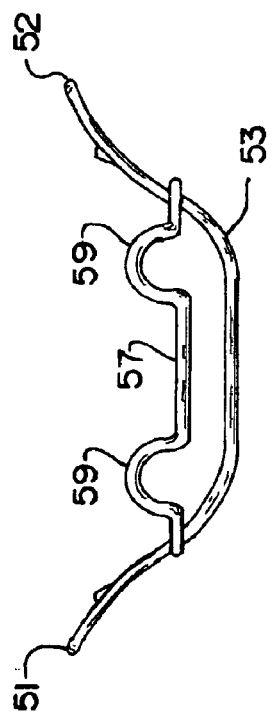
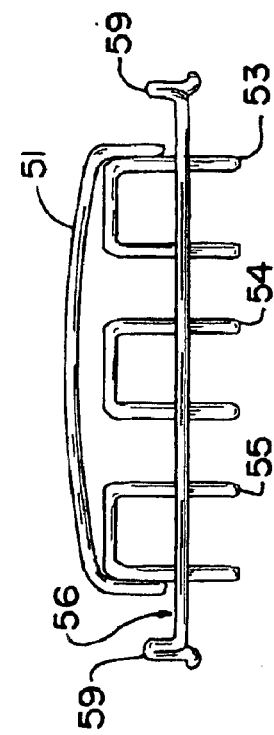
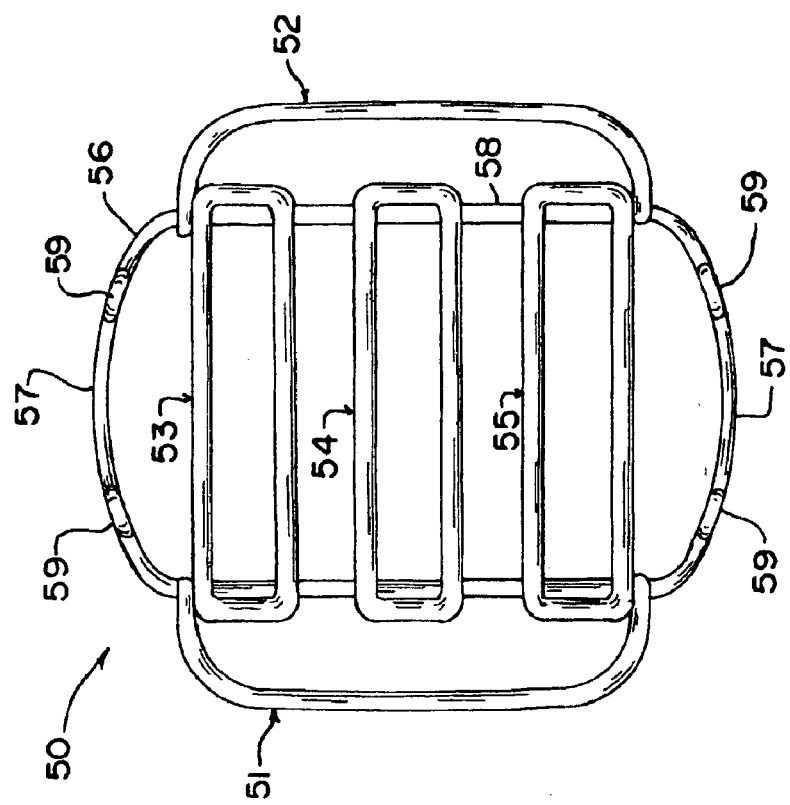

ROASTING APPARATUS

BACKGROUND OF THE INVENTION

1. Field of the Invention

The present invention relates to a roasting apparatus. More specifically, the present invention relates to a roasting apparatus that includes both a roasting rack and a roasting pan in which the roasting rack is suspended from handle bosses above a roasting pan bottom.

2. Description of the Related Art

Conventionally available roasting pans and roasting racks are often ill suited to convenient and safe user operation. Conventional roasting racks are designed to operate with a variety of roasting pan sizes and shapes and consequently only loosely fit within the roasting pan. Conventional roasting rack and roasting pan designs do not adequately consider the safety aspects of roasting and basting operations.

Where conventional racks do not securely fit with in conventional roasting pans, the racks can slide relative to the pan itself during use, cleaning, and removal or entry into a hot oven. The loose fit and subsequent sliding can cause unexpected weight shifts and possible injury through contact with a hot roasting pan, hot roasting rack, or the hot food itself. Lose fit may also allow the roasting rack to shift relative to the roasting pan during oven insertion, resulting in uneven heat distribution and possible burning. Loose fit may further allow a conventional roasting rack to slide and scrape the surface of a roasting pan, causing damage to the roasting pan and degradation to a non-stick surface.

Conventional roasting pans also have legs that support the roasting rack above a roasting pan bottom. These conventional legs cause substantial difficulty during rack movement by scraping a pan bottom or breaking and bending resulting in uneven roast placement and danger to an operator. Roasting rack legs also interfere during basting by blocking smooth user access to any hot grease or liquids in the bottom of the roasting pan. During basting, operators frequently raise one side of a roasting pan, allowing the hot grease or liquids to roll to the opposite side for easy pick up in a baster. This sideways basting movement also shifts the roasting rack causing the scraping problems noted above.

During use, as an operator lifts the roasting rack from the roasting pan, the pan legs frequently catch the rim of the roasting pan, cause rack or pan tipping, and possibly cause the hot food to slide around the rack.

Conventional roasting rack legs are often physically weak and extend from portions of the roasting rack by a single weld. With the physical contact and lateral stress noted above pan legs are frequently the weakest link in rack design and break or bend rendering the rack dangerous or useless.

Conventional roasting rack legs also cause damage or staining to counter surfaces after removal form the roasting pan. During repeated operation, roasting rack legs can develop sharp edges or loose a portion of their chrome finish leaving a sharp edge. These sharp edges can scrape laminate and solid-surface counter materials and can damage a polished surface on stone or concrete counter materials. As the roasting rack legs are often covered with grease or fluid residue that has dripped to the bottom of the roasting pan, upon removal, the residue commonly drips from leg bottoms, which act as fluid flow stress concentrators. Since the roasting residue can stain natural counter materials, kitchen floors, and operator clothing, it would be beneficial to remove this risk all together.

Finally, conventional roasting rack legs may become stuck in overcooked or burned-on residue in the base of the roasting pan further increasing operator safety risk and damage to the roasting rack.

Conventional roasting racks have two handles that are positioned perpendicular to a long axis of the roasting rack. This conventional handle placement interferes with user access to roasting pan handles, makes it difficult to grip the handles with thermal protection, and increases the risk of tipping a roast from the roasting rack.

In summary, the problems of commercially available roasting pans and roasting racks include:

1. Sharp legs on a roasting rack provide uneven support, scratch non-stick pan surfaces, catch on pan sides during removal, interfere with basting, increase thermal variability, damage counter surfaces after removal, and stick to residue at the bottom of a roasting pan interfering with removal risking operator safety.
2. Poorly positioned handles, specifically handles perpendicular to a long rack-edge, increase risk of tipping during use, are small and difficult to handle with thermal hand protection, and are inappropriate for high-weight roasting situations where lifting is awkward.
3. Poorly designed racks that move or slip relative to a pan rim during oven positioning and basting operations damage pan walls and create hot-spots where a roast shifts and contacts the pan, and risk operator injury during oven insertion/extraction.

OBJECTS AND SUMMARY OF THE INVENTION

An object of the present invention is to overcome the detriments noted above and provide a safe, secure, and user-friendly roasting apparatus.

It is another object of the present invention is to provide a roasting apparatus that prevents a roasting rack from shifting laterally or transversely relative to a roasting pan during use.

It is another object of the present invention to provide a roasting rack, which does not touch a roasting pan bottom and allows for simple basting and safe separation after use.

It is another object of the present invention to provide a roasting apparatus that does not interfere with simple roasting rack removal and allows easy use with thermal protection.

It is another object of the present invention to provide a roasting pan apparatus that does not cause scratching and sliding damage a roasting pan or counter tops during use.

The present invention relates to a roasting apparatus that includes a roasting pan that reliably secures an improved roasting rack. The roasting rack is secured in retaining channels on respective handle bosses providing a 4-point support system that resists lateral and transverse shifting during use. A pair of handles extends along a long axis of the roasting rack enabling simple and secure separation of the roasting rack from the roasting pan.

According to an embodiment of the present invention there is provided a roasting apparatus, comprising: a roasting pan having a first and a second opposing pan handle member, the first and second pan handle members arrayed perpendicular to a first axis of the roasting pan, a roasting rack, an endless outer member in the roasting rack adapted to fit within the roasting pan, a plurality of support members spanning a plurality of side sections of the endless outer member, a pair of rack handle members extending from the roasting rack arrayed parallel to the first axis of the roasting pan, and means for suspending the roasting rack distant from a roasting pan bottom and for securing the roasting rack to the roasting pan during a use, whereby after an assembly the means for suspending and securing reliably supports the roasting rack and eliminate shifting of the roasting rack relative to the roasting pan.

According to another embodiment of the present invention, there is provided a roasting apparatus, wherein: the means for suspending and securing includes a plurality of retaining channels projecting from the first and second pan handle members, each of the handle member including a top section and a bottom section, each of the top section having an arcute shape extending away from a roasting pan interior, each bottom section including a boss portion projecting toward the roasting pan interior, each boss portion including one the retaining channel, and the means for suspending and securing including a plurality of saddles in the endless outer member adjacent respective the retaining channels after the assembly, whereby the retaining channels of the first and the second pan handles support respective the saddles during the use and prevent sliding of the roasting rack relative to the roasting pan.

According to another embodiment of the present invention, there is provided a roasting apparatus, wherein: each of the support member is an elongated continuous member, each of the support member affixed to the endless outer member at at least four points, whereby each the support member operates as a torsion member to prevent racking misalignment of the roasting rack during the use.

According to another embodiment of the present invention, there is provided a roasting apparatus, wherein: each of the rack handle member extends from at least one of the endless outer member and the plurality of support members, and each of the rack handle member has an arcute shape extending away from the roasting pan interior, whereby during the use, a simple and safe user operation occurs while allowing easy use of thermal protection.

According to another embodiment of the present invention, there is provided a roasting apparatus, wherein: the means for suspending and securing includes a plurality of retaining channels projecting from walls of the roasting pan, whereby the walls of the roasting pan support the roasting rack distant from a bottom of the roasting pan during the use while allowing easy removal.

According to another embodiment of the present invention, there is provided a roasting apparatus, wherein: each of the support member is an elongated continuous member, each the support member affixed to the endless outer member at at least four points, whereby each the support member operates as a torsion member to prevent racking misalignment of the roasting rack during the use.

According to another embodiment of the present invention, there is provided a roasting apparatus, wherein: each the rack handle member extends from at least one of the endless outer member and the plurality of support members, and each the rack handle member has an arcute shape extending away from a roasting pan interior, whereby during the use, a simple and safe user operation occurs while allowing easy use of thermal protection.

According to another embodiment of the present invention there is provided a roasting apparatus, comprising: a roasting pan having a first and a second opposing pan handle member, the first and second pan handle members arrayed perpendicular to a first axis of the roasting pan, a plurality retaining channels projecting perpendicular to the first axis toward a roasting pan interior from at least one of the roasting pan and the first and second pan handle members, each the retaining channel having a first outer surface opposite a bottom of the roasting pan, a roasting rack, an endless outer member in the roasting rack adapted to fit within the roasting pan, a plurality of support members spanning a plurality of side sections of the endless outer member, a pair of rack handle members extending from the roasting rack arrayed parallel to the first axis, as plurality of saddle sections on the endless outer member proximate each the retaining channel, and each of the saddle section having a first inner surface matching respective the first outer surface whereby after an assembly the retaining channels reliably support the saddle sections and the roasting rack distant from the bottom of the roasting pan while eliminating shifting of the roasting rack relative to the roasting pan during a use.

According to another embodiment of the present invention, there is provided a roasting apparatus, wherein: the plurality of retaining channels projects from the first and second pan handles members, a top section and a bottom section on each the handle member, each the top section having an arcute shape extending away from the roasting pan interior, each the bottom section including a boss portion projecting toward the roasting pan interior, and the retaining channels on respective the boss portions, whereby the boss portions of the first and the second pan handles support respective the saddle sections and the roasting rack during the assembly and the use while allowing easy removal.

According to another embodiment of the present invention, there is provided a roasting apparatus, wherein: each of the support members is an elongated continuous member, each of the support member affixed to the endless outer member at at least four points, whereby each the support member operates as a torsion member to prevent a racking misalignment of the roasting rack during the use.

According to another embodiment of the present invention, there is provided a roasting apparatus, wherein: each of the rack handle member extends from at least one of the endless outer member and the plurality of support members, and each the rack handle member has an arcute shape extending away from the roasting pan interior, whereby during the use, simple and safe user operation occurs while allowing easy use of thermal protection.

According to another embodiment of the present invention, there is provided a roasting apparatus, wherein: the plurality of roasting channels projects from a set of opposing walls of the roasting pan, whereby the walls of the roasting pan support the saddle sections and the roasting rack distant from the bottom during the assembly and the use while allowing easy removal.

According to another embodiment of the present invention, there is provided a roasting apparatus, wherein: each of the support member is an elongated continuous member, and each of the support member affixed to the endless outer member at at least four points, whereby each the support member operates as a torsion member to prevent a racking misalignment of the roasting rack during the use.

According to another embodiment of the present invention, there is provided a roasting apparatus, wherein: each of the rack handle member extends from at least one of the endless outer member and the plurality of support members, and each the rack handle member has an actuate shape extending away from the roasting pan interior, whereby during the use, simple and safe user operation occurs while allowing easy use of thermal protection.

The above, and other objects, features and advantages of the present invention will become apparent from the following description read in conduction with the accompanying drawings, in which like reference numerals designate the same elements.

BRIEF DESCRIPTION OF THE DRAWINGS

FIG. 2 is a top view of a roasting pan according to the present invention.

FIG. 3 is an end view of a roasting pan according to the present invention.

FIG. 4 is a side view of a roasting pan according to the present invention.

DETAILED DESCRIPTION OF THE PREFERRED EMBODIMENTS

Figure 1:
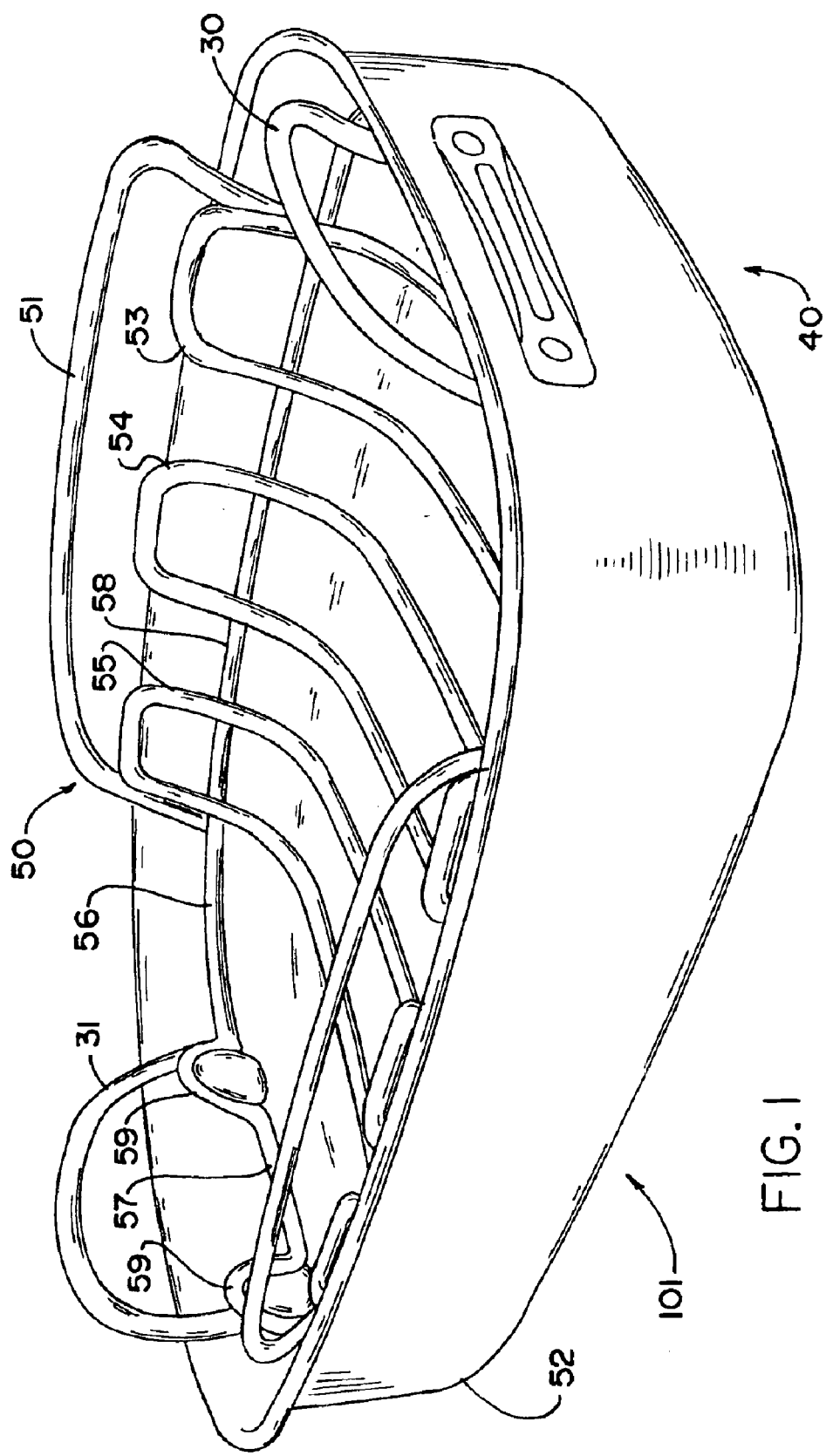
FIG. 1 is a perspective view of a roasting rack and a roasting pan according to one embodiment of the present invention.

Referring now to FIGS. 1 and 2, a roasting apparatus 101 includes a roasting rack 50 and a roasting pan 40. Roasting pan 40 includes opposing roasting pan handles 30, 31. Roasting rack 50 is formed from six (6) individual members, including a continuous member 56 (an endless outer member) having two long side sections 58, 58 and two short side sections 57, 57. A pair of saddle sections 59, 59 is formed on each short side section 57 as shown. Saddle sections 59, 59 secure roasting rack 50 to roasting pan 40, and space roasting rack 50 from a bottom of roasting pan 40, as will be described.

A trio of continuous support members spans long side sections 57, 57 and include a first support member 53, a second support member 54, and a third support member 55. A pair of handle members 51, 52 project from outside sections of support members 53, 55 and extend laterally along long side sections 58, parallel to a long axis of roasting pan 50. Handle members 51, 52 extend in an actuate shape allowing easy user grip with thick thermal protection and broad gripping surface to ensure a secure grasp.

Referring now to FIGS. 3 and 4, support members 53, 54, 55 are formed to follow a smooth concave shape matching a bottom of roasting pan 40. Handle members 51, 52 extend the concave shape of support members 53, 54, 555 into a convex position extending beyond an outer roasting pan rim 35, as will be explained. Handle members 51, 52 extend in an arcuate shape above outer ends of support members 53, 54, 55 to allow easy user access. Saddles 59 extend in generally semicircular forms from short side sections 57, as shown. Saddles 59 lock roasting pan 40 into retaining channels 44 (shown later) on roasting rack 50. Short side sections 57, 57 have an actuate shape matching an inner shape of roasting pan 40, as will be shown. Long side sections 58, 58 are generally parallel to provide easy welding to respective support members 53, 54, and 55 during a fabrication process.

Roasting rack 50 is formed from any suitable metal material that allows smooth and continuous forming minimizing sharp edges and food retaining surfaces. Each support member 53, 54, and 55 is formed in an endless loop and is secured (welded) to continuous member 56 in four (4) spots. This four-point connection provides a very secure and a durable connection between each support member and continuous member 56.

Figure 5:
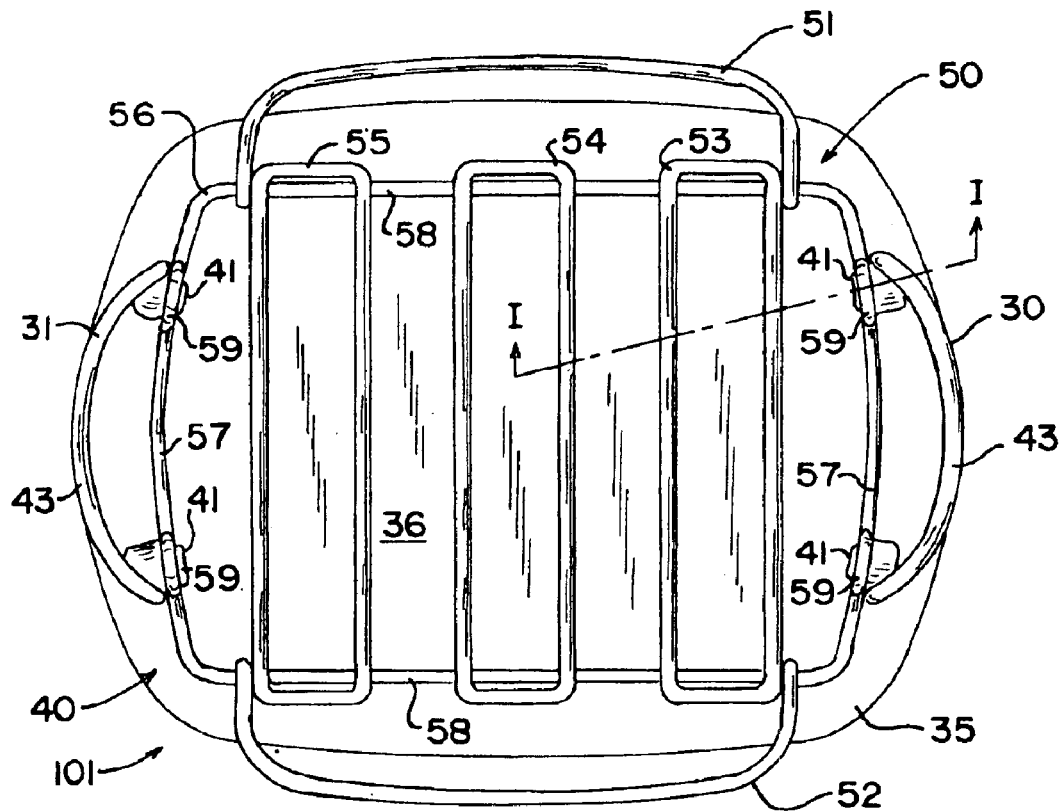
FIG. 5 is a top view of a roasting apparatus according to the present invention.
Figure 6:
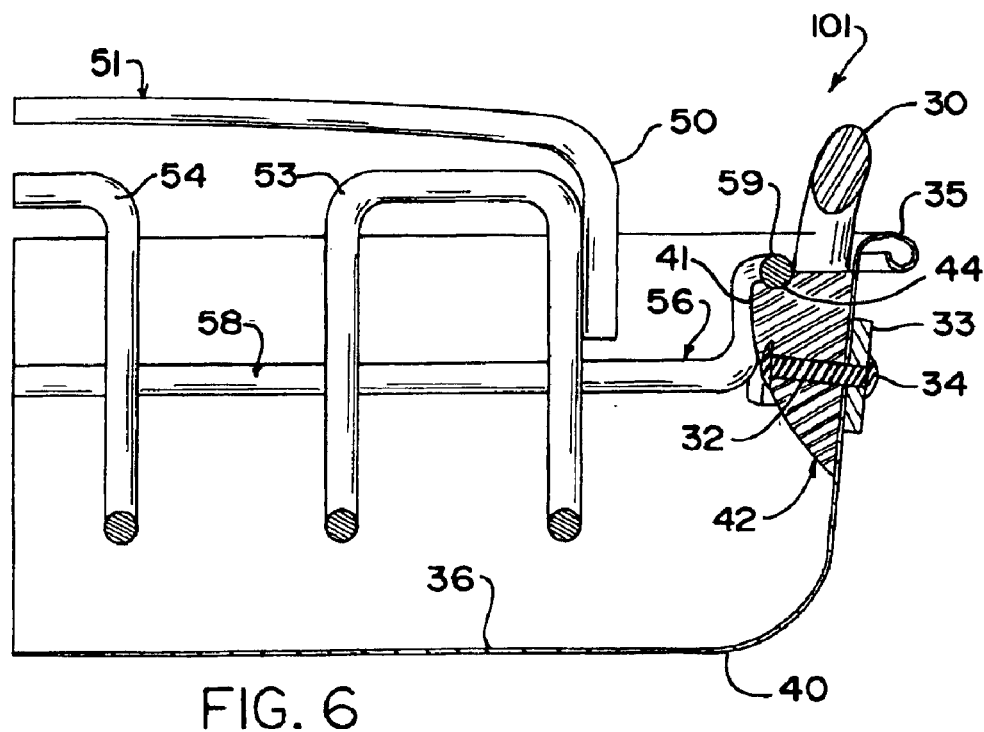
FIG. 6 is a partial sectional view along lines I—I in FIG. 5.

Referring now to FIGS. 5 and 6 roasting pan 40 includes pan rim 35 and a roasting pan bottom 36 opposite bottom sections of respective support members 53, 54, and 55. Each pan handle 30, 31 includes a top section 43 and a bottom section 42. Bottom sections 42 each extend in a handle boss portion 41, as shown. Boss portions 41 each include retaining channels 44 having a radius (alternatively described as an outer surface) matching an inner radius (alternatively described as an inner surface) of respective saddles 59. While the present embodiment shows retaining channels 44 and saddles 59 having semicircular or arcuate shapes, other effective shapes are envisioned including angular and flat shapes effective to retain roasting rack 50 in roasting pan 40.

Retaining channels 44 extend from boss portions and receive saddles 59 during an assembly of roasting apparatus 101. Pan rim 35 is a rolled rim that enables smooth transfer and sliding removal of roasting rack 40 from roasting pan 50. This type of smooth surface interaction between bottoms of support members 53, 54, 55, bottoms of handle members 51, 52, and rolled pan rim 35 ensures repeatable and predictable rack removal during use.

Rivets 32 extend through handle boss portions 41 and secure each pan handle 30, 31 to roasting pan 40 by respective rivet bosses 34. A label member 33 is retained by rivet bosses 34, opposite handle boss portions 41.

Figure 7:
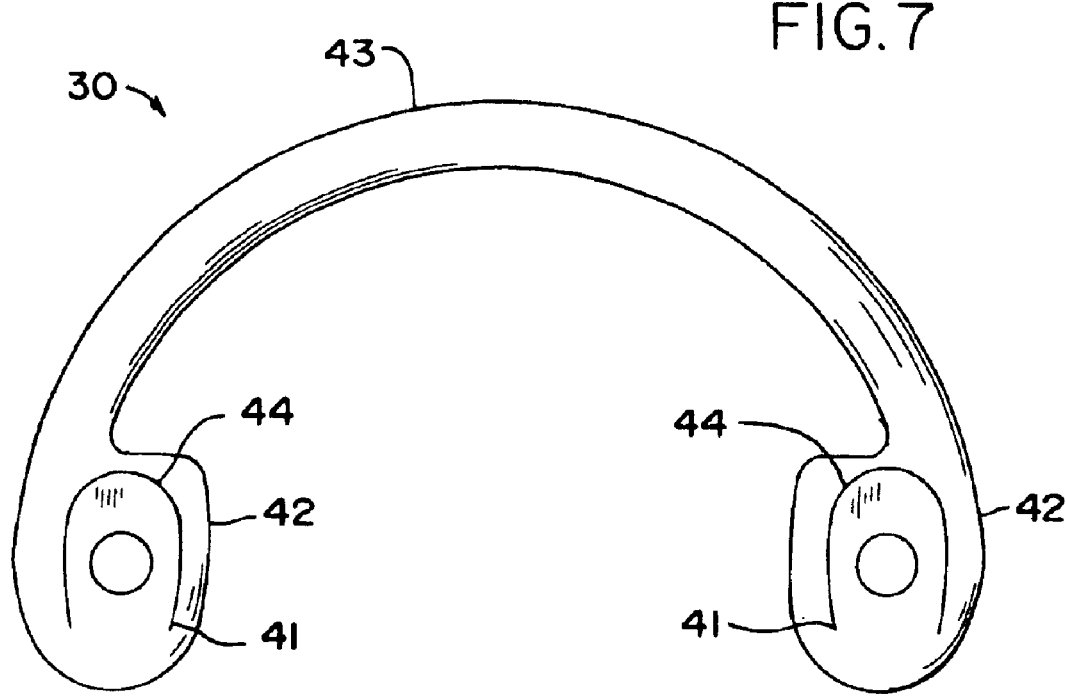
FIG. 7 is a side view of a pan handle according to one embodiment of the present invention.
Figure 8:
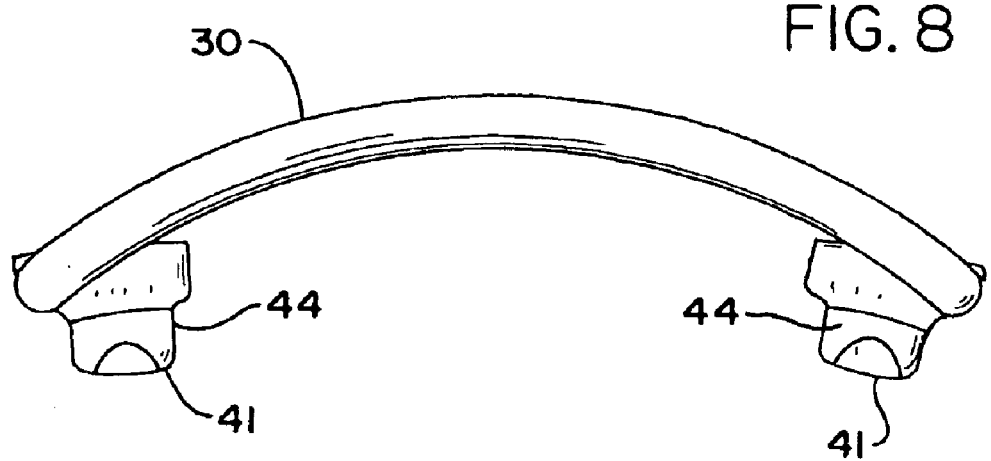
FIG. 8 is a top view of a pan handle according to one embodiment of the present invention.

Referring now to FIGS. 7 and 8, top sections 43 of respective handle portions 30, 31 each follow an arcuate shape away from pan rim 35, allowing easy and secure user gripping. Bottom sections 42, 42 project away from the plane of top sections 43, 43 and prevent top sections 43, 43 from interfering with the connection between saddles 59, and retaining cannels 44, 44 on respective handle bosses 41, 41. This design and spacing also makes it easy for an operator to grip handle members 51, 52 with thick thermal protection.

A benefit of the present design is that retaining channels 44 on boss portions 41 support saddle portions 59 above any possible grease or liquid contamination on roasting pan bottom 36. Consequently, removing roasting rack 50 is never hindered by overcooked or burned-on residue on pan bottom 36.

Another benefit of the present design is that roasting rack 50 is securely retained in roasting pan 40, eliminating any possible lateral or transfers shifting during use.

Another benefit of the present invention is the elimination of roasting rack legs and the detrimental effects of the same, as noted above.

Another benefit of the present invention is improved operator safety. Handle members 51, 52 are long, parallel to a long axis of roasting rack 50, and project upward and outward from pan rim 35, as shown. Consequently, users have substantially increased gripping surface parallel to the long axis. This positioning and spacing allows users with thick thermal protection to gain increased control over heavy foods in awkward positions.

Another benefit of the present invention is that retaining channels 44 may be alternatively formed separate from pan handles 30, 31 and extend from walls of roasting pan 40. In this manner, retaining channels 44 can be formed during the roasting pan metal-press operation step and costs can be saved by reducing the size and weight of handle bottom sections 42 and handle bosses 41.

Another benefit of the present invention is that it may be readily adapted to large sized roasting pans 40 having squarish or quadrilateral shapes. It is not necessary that roasting pans 40 and roasting racks 50 have a rectangular shape to reap the other benefits of the present invention since in this embodiment, pan handles 30, 31 are on opposite sides from handle members 51, 52.

Another benefit of the present invention is that saddles 59 may be alternatively arrayed along long side sections 58, 58 (along with pan handles 30, 31 and retaining channels 44) and corresponding handle members 51, 52 may be shifted to short side sections 57, 57. In this embodiment, with rectangular roasting pan 40 extra heavy roasting loads may be used as the support points for roasting rack 50 have been broadened to spread the load along a wider area of roasting pan 40. In this embodiment, the sides are shifted, but alternating sides for handle members 51, 52 and pan handles 30, 31 are maintained.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part, in the environment of fastening wooden parts, a nail, a screw, and a bolt may be readily understood by those skilled in the art as equivalent structures.

Although only a single or few exemplary embodiments of this invention have been described in detail above, those skilled in the art will readily appreciate that, many modifications are possible in the exemplary embodiment(s) without materially departing from the novel teachings and advantages of this invention. Accordingly, all such modifications are intended to be included within the spirit and scope of this invention as defined in the following claims.

What is claimed is:

1. A roasting apparatus, comprising:

a roasting pan having a first and a second opposing pan handle member;

said first and second pan handle members arrayed perpendicular to a first axis of said roasting pan;

a roasting rack;

an endless outer member in said roasting rack adapted to fit within said roasting pan;

a plurality of support members spanning a plurality of side sections of said endless outer member;

a pair of rack handle members extending from said roasting rack arrayed parallel to said first axis of said roasting pan;

means for suspending said roasting rack distant from a roasting pan bottom and for securing said roasting rack to said roasting pan during a use thereof, whereby after an assembly, said means for suspending and securing reliably supports said roasting rack and eliminates shifting of said roasting rack relative to said roasting pan;

said means for suspending and securing including a plurality of retaining channels projecting from said first and second pan handle members;

each said handle member including a top section and a bottom section;

each said top section having an arcuate shape extending away from a roasting pan interior;

each said bottom section including a boss portion projecting toward said roasting pan interior;

each said boss portion including one said retaining channel; and said means for suspending and securing including a plurality of saddles in said endless outer member adjacent respective said retaining channels after said assembly, whereby said retaining channels of said first and said second pan handles support respective said saddles during said use and prevent sliding of said roasting rack relative to said roasting pan.

2. A roasting apparatus, according to claim 1, wherein:

each said support member is an elongated continuous member; and each said support member affixed to said endless outer member at at least four points, whereby each said support member operates as a torsion member to prevent racking misalignment of said roasting rack during said use.

3. A roasting apparatus, according to claim 2, wherein:

each said rack handle member extends from at least one of said endless outer member and said plurality of support members; and each said rack handle member has an arcuate shape extending away from said roasting pan interior, whereby during said use, a simple and safe user operation occurs while allowing easy use of thermal protection.

4. A roasting apparatus, comprising:

a roasting pan having a first and a second opposing pan handle member;

said first and second pan handle members arrayed perpendicular to a first axis of said roasting pan;

a roasting rack;

an endless outer member in said roasting rack adapted to fit within said roasting pan;

a plurality of support members spanning a plurality of side sections of said endless outer member;

a pair of rack handle members extending from said roasting rack arrayed parallel to said first axis of said roasting pan;

means for suspending said roasting rack distant from a roasting pan bottom and for securing said roasting rack to said roasting pan during a use thereof, whereby after an assembly, said means for suspending and securing reliably supports said roasting rack and eliminates shifting of said roasting rack relative to said roasting pan;

said means for suspending and securing including a plurality of retaining channels projecting from walls of said roasting pan, whereby said walls of said roasting pan support said roasting rack distant from a bottom of said roasting pan during said use, while allowing easy removal thereof.

5. A roasting apparatus, according to claim 4, wherein:

each said support member is an elongated continuous member; and each said support member affixed to said endless outer member at at least four points, whereby each said support member operates as a torsion member to prevent racking misalignment of said roasting rack during said use.

6. A roasting apparatus, according to claim 5, wherein:

each said rack handle member extends from at least one of said endless outer member and said plurality of support members; and each said rack handle member has an arcuate shape extending away from a roasting pan interior, whereby during said use, a simple and safe user operation occurs while allowing easy use of thermal protection.

7. A roasting apparatus, comprising:

a roasting pan having a first and a second opposing pan handle member;

said first and second pan handle members arrayed perpendicular to a first axis of said roasting pan;

a plurality retaining channels projecting perpendicular to said first axis toward a roasting pan interior from at least one of said roasting pan and said first and second pan handle members;

each said retaining channel having a first outer surface opposite a bottom of said roasting pan:

a roasting rack;

an endless outer member in said roasting rack adapted to fit within said roasting pan;

a plurality of support members spanning a plurality of side sections of said endless outer member;

a pair of rack handle members extending from said roasting rack arrayed parallel to said first axis;

a plurality of saddle sections on said endless outer member proximate each said retaining channel; and each said saddle section having a first inner surface matching respective said first outer surface, whereby after an assembly said retaining channels reliably support said saddle sections and said roasting rack distant from said bottom of said roasting pan while eliminating shifting of said roasting rack relative to said roasting pan during a use.

8. A roasting apparatus, according to claim 7, wherein:

said plurality of retaining channels projects from said first and second pan handle members;

a top section and a bottom section on each said handle member;

each said top section having an arcuate shape extending away from said roasting pan interior;

each said bottom section including a boss portion projecting toward said roasting pan interior; and said retaining channels on respective said boss portions, whereby said boss portions of said first and said second pan handles support respective said saddle sections and said roasting rack during said assembly and said use while allowing easy removal.

9. A roasting apparatus, according to claim 8, wherein:

each said support member is an elongated continuous member;

each said support member affixed to said endless outer member at at least four points, whereby each said support member operates as a torsion member to prevent a racking misalignment of said roasting rack during said use.

10. A roasting apparatus, according to claim 9, wherein:

each said rack handle member extends from at least one of said endless outer member and said plurality of support members; and each said rack handle member has an arcuate shape extending away from said roasting pan interior, whereby during said use, simple and safe user operation occurs while allowing easy use of thermal protection.

11. A roasting apparatus according to claim 7, wherein:

said plurality of roasting channels projects from a set of opposing walls of said roasting pan, whereby said walls of said roasting pan support said saddle sections and said roasting rack distant from said bottom during said assembly and said use while allowing easy removal.

12. A roasting apparatus, according to claim 11, wherein:

each said support member is an elongated continuous member; and each said support member affixed to said endless outer member at at least four points, whereby each said support member operates as a torsion member to prevent a racking misalignment of said roasting rack during said use.

13. A roasting apparatus, according to claim 12, wherein:

each said rack handle member extends from at least one of said endless outer member and said plurality of support members; and each said rack handle member has an arcuate shape extending away from said roasting pan interior, whereby during said use, simple and safe user operation occurs while allowing easy use of thermal protection.

* * * * *